United States Patent [19]

Watanabe et al.

[11] Patent Number: 5,566,247
[45] Date of Patent: Oct. 15, 1996

[54] TAUGHT DATA SETTING METHOD IN A VISUAL SENSOR SYSTEM

[75] Inventors: Atsushi Watanabe; Taro Arimatsu, both of Yamanashi, Japan

[73] Assignee: Fanuc Ltd., Yamanashi, Japan

[21] Appl. No.: 91,085

[22] Filed: Jul. 14, 1993

Related U.S. Application Data

[63] Continuation of Ser. No. 893,952, Jun. 4, 1992, abandoned, which is a continuation of Ser. No. 571,525, filed as PCT/JP90/00165, Feb. 9, 1990, abandoned.

[30] Foreign Application Priority Data

Oct. 2, 1989 [JP] Japan ................................. 1-29735

[51] Int. Cl.$^6$ .................................................. G06K 9/62
[52] U.S. Cl. ........................................ 382/155; 382/141
[58] Field of Search ...................... 382/100, 141, 382/155; 358/101, 106, 107; 364/468, 474.12, 474.23, 474.28; 901/47

[56] References Cited

U.S. PATENT DOCUMENTS

| | | | |
|---|---|---|---|
| 4,253,111 | 2/1981 | Funk et al. | 358/101 |
| 4,379,308 | 4/1983 | Kosmowski et al. | 358/106 |
| 4,494,139 | 1/1985 | Shima et al. | 358/101 |
| 4,613,269 | 9/1986 | Wilder et al. | 364/513 |
| 4,680,802 | 7/1987 | Nishida et al. | 382/8 |
| 4,876,728 | 10/1989 | Roth | 382/21 |
| 4,907,169 | 3/1990 | Lovoi | 364/513 |

*Primary Examiner*—Jose L. Couso
*Attorney, Agent, or Firm*—Staas & Halsey

[57] ABSTRACT

A taught data setting method in a visual sensor system, capable of automatically and rapidly setting optimum taught data. An image of a single circular sample is subject to image processing to determine formal setting values of first to sixth parameters (P1–P6), respectively corresponding to circle diameter, circumference, area and deformation degree, and types of a smoother filter and an emphasizing filter. Many sample images are then subject to image processing which utilizes the formal setting values, to thereby determine set center positions of the respective images. An optimum value of the first parameter enough to minimize the sum of the squares of the errors between the set center positions and image center positions is automatically determined (100), the image center positions being detected while the first parameter is changed, with the second to fourth parameters kept fixed at their formal setting values. Similarly, optimum values of the second to fourth parameters are determined (100–103). Image processing is further performed while changing filter types and keeping the first to fourth parameters fixed at their optimum values, thereby determining optimum values of the fifth and sixth parameters (108,109).

11 Claims, 4 Drawing Sheets

TAUGHT DATA SETTING METHOD IN A VISUAL SENSOR SYSTEM

This application is a continuation of application Ser. No. 07/893,952, filed Jun. 4, 1992, now abandoned, which is is continuation of Ser. No. 07/571,525, filed as PCT/JP90/00165, Feb. 9, 1990, now abandoned.

TECHNICAL FIELD

The present invention relates to a taught data setting method in a visual sensor system, capable of automatically setting optimum taught data.

BACKGROUND ART

In various kinds of machines such as industrial robots, it is conventionally known to control the operating position and orientation of a machine operating section, e.g., a robot hand, in dependence on the position of a work object, which is detected by a visual sensor system, to thereby effect required work. Typically, in this case, an image of a single sample object is analyzed to prepare taught data (model) for image processing, which is to be supplied beforehand to a visual sensor. Then, to recognize the position of the work object, the taught data is compared with an image (scene) of the work object photographed by a camera of the visual sensor system. Conventionally, a manual modification of the taught data is carried out in a trial-and-error manner, so long as instability is found in the work object recognition based on the taught data. This taught data modification requires skill and labor.

DISCLOSURE OF THE INVENTION

The object of the present invention is to provide a taught data setting method in a visual sensor system, which is capable of automatically setting optimum taught data.

In order to achieve the above-mentioned object, a taught data setting method of the present invention comprises the steps of: (a) storing a plurality of sample images; (b) determining formal setting values of taught data on the basis of one of the plurality of sample images; (c) detecting and setting feature data, which specifies a position of each of the plurality of sample images, from each sample image by using the formal setting values; (d) detecting the respective feature data of the plurality of sample images while changing at least one of the formal setting values; and (e) automatically determining values of the taught data enough to minimize an error between each of the detected feature data and a corresponding one of the set feature data, and automatically setting the determined values as optimum values of the taught data.

As mentioned above, according to the present invention, the feature data of each sample image specifying the position of each of the plurality of sample images is detected and set by using the formal setting values determined on the basis of a single sample image, and the values of the taught data enough to minimize the errors between the feature data of the respective sample images, detected while changing the at least one formal setting value, and the corresponding ones of the aforesaid set feature data are automatically set as the optimum values of taught data. Accordingly, the optimum taught data can be set rapidly, without the need of intervention of a skilled operator.

BEST MODE OF CARRYING OUT THE INVENTION

Figure 1:
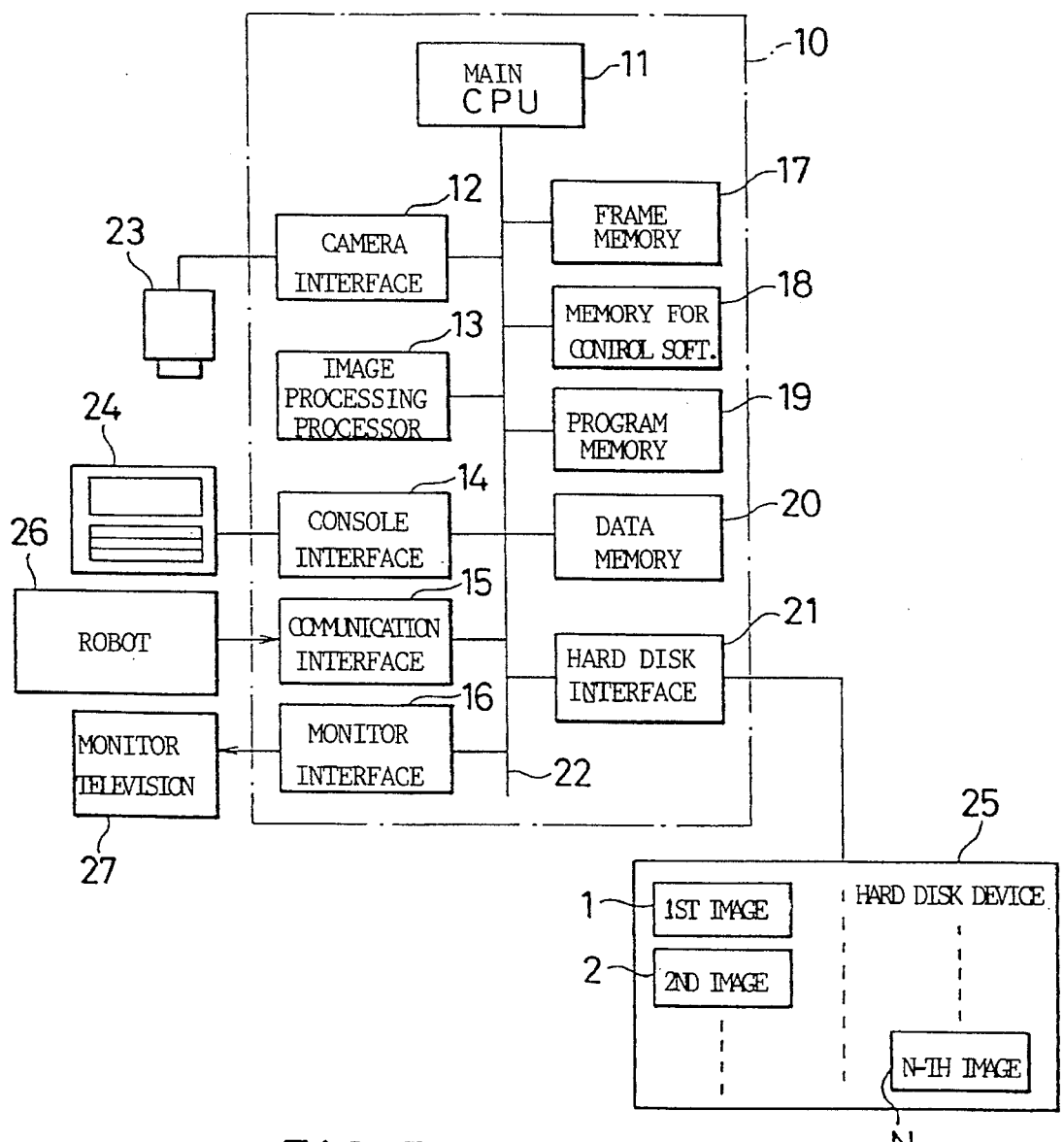
FIG. 1 is a schematic view showing essential part of a visual sensor system for embodying a taught data setting method according to an embodiment of the present invention.
Figure 5:
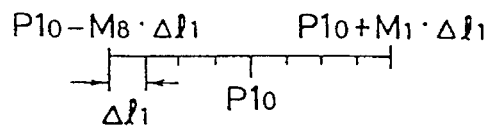
FIG. 5 is a view showing a region within which a formal setting value of the first parameter is changed, and intervals at which the formal setting value is changed.

Referring to FIG. 1, a visual sensor system to which a taught data setting method according to an embodiment of the present invention is applied comprises an image central processing device 10. This processing device 10 comprises a main central processing unit (hereinafter referred to as main CPU) 11, a camera interface 12, an image processing processor 13, a console interface 14, a communication interface 15, a monitor interface 16, and a frame memory 17. Further, the device 10 comprises a memory 18, comprised of a ROM, for storage of control software, a program memory 19 comprised of a RAM, and a hard disk interface 21. These elements 12 to 21 are connected to the main CPU 11 through busses 20.

More specifically, a camera 23 for photographing objects, e.g., components of various kinds, is connected to the camera interface 12. An image from the camera 23 is supplied to the camera interface 12 in which the image is subjected to an A/D conversion, to be converted into a gray scale image consisting of 256×256 picture elements each of which is represented by 1 byte, and the gray scale image is stored in the frame memory 17. Whereupon, the gray scale image is subjected to image processing in the image processing processor 13 for identification of the object and for detection of the position and orientation of the object. The resultant taught data and the like are stored in the data memory 20. A hard disk device 25 connected to the hard disk interface 21 comprises a hard disk whose capacity is 20 megabytes for storage of approximately 320 images.

Connected to the console interface 14 is a console 24 which comprises various kinds of keys, including numeric keys, for input of various commands and for input, edit, registration, execution, etc., of an application program, and a liquid crystal display for displaying various work menus, a program list, etc. Further, a machine, e.g., a robot 26, on which the visual sensor system is mounted, and a monitor television 27 for displaying the image photographed by the camera 23 are connected to the communication interface 15 and the monitor interface 16, respectively. The control software memory 18 is arranged to store a program for visual sensor system control, and the program memory 19 is arranged to store a user program which is prepared by operator's operations in accordance with a menus displayed on the console 24.

With reference to FIGS. 2 to 5, an automatic parameter setting process of the visual sensor system will be explained.

At first, a required number of sample objects, e.g., N sample objects (not shown) are photographed in sequence by the camera 23, preferably, at the same photograph position. For instance, these samples are arbitrarily extracted from a large number of circular objects of the same kind. Preferably, the samples have variations in their sizes, shapes, etc. Then, the gray scale images (hereinafter referred to as sample images 1 to N) of the samples are stored in the frame memory 17. Thereafter, the sample images 1 to N are sequentially transferred to and stored in the hard disk of the hard disk device 25.

Whereupon, in response to an operator's operation of the console 24, an arbitrary one of the sample images 1 to N is read out from the hard disk, to be stored in the frame memory 17. This single sample image is subjected to image processing in the image processing processor 13, so that values P10 to P60 of first to sixth parameters P1 to P6 for image processing are detected from the single sample image, as taught data with respect to the circular object. The detected values P10 to P60 are stored in the data memory 20, as formal setting values of the taught data.

Here, the first to fourth parameters P1 to P4 are the diameter, circumference, area, deformation degree (area/square of circumference) of the circle, respectively. The fifth and sixth parameters P5 and P6 are a type of a smoother filter for improving flicker developed on the screen, and a type of an emphasizing filter for improving obscurity of the screen image, respectively.

The sample images 1 to N, which are sequentially transferred from the hard disk to the frame memory 17, are sequentially subjected to image processing with the use of the formal setting values P10 to P60, and feature data (in the present embodiment, the center positions C10 to CN0 of the images) specifying positions of the respective sample images are detected in sequence. Upon detection of the image center positions, the operator manually corrects a dislocation of the image center position, where required, with reference to the sample image concerned which is displayed on the monitor television 27, and manually sets the corrected center position of the image. The thus detected and set image center positions C10 to CN0 of the sample images 1 to N are stored in the data memory 20.

Figure 2:
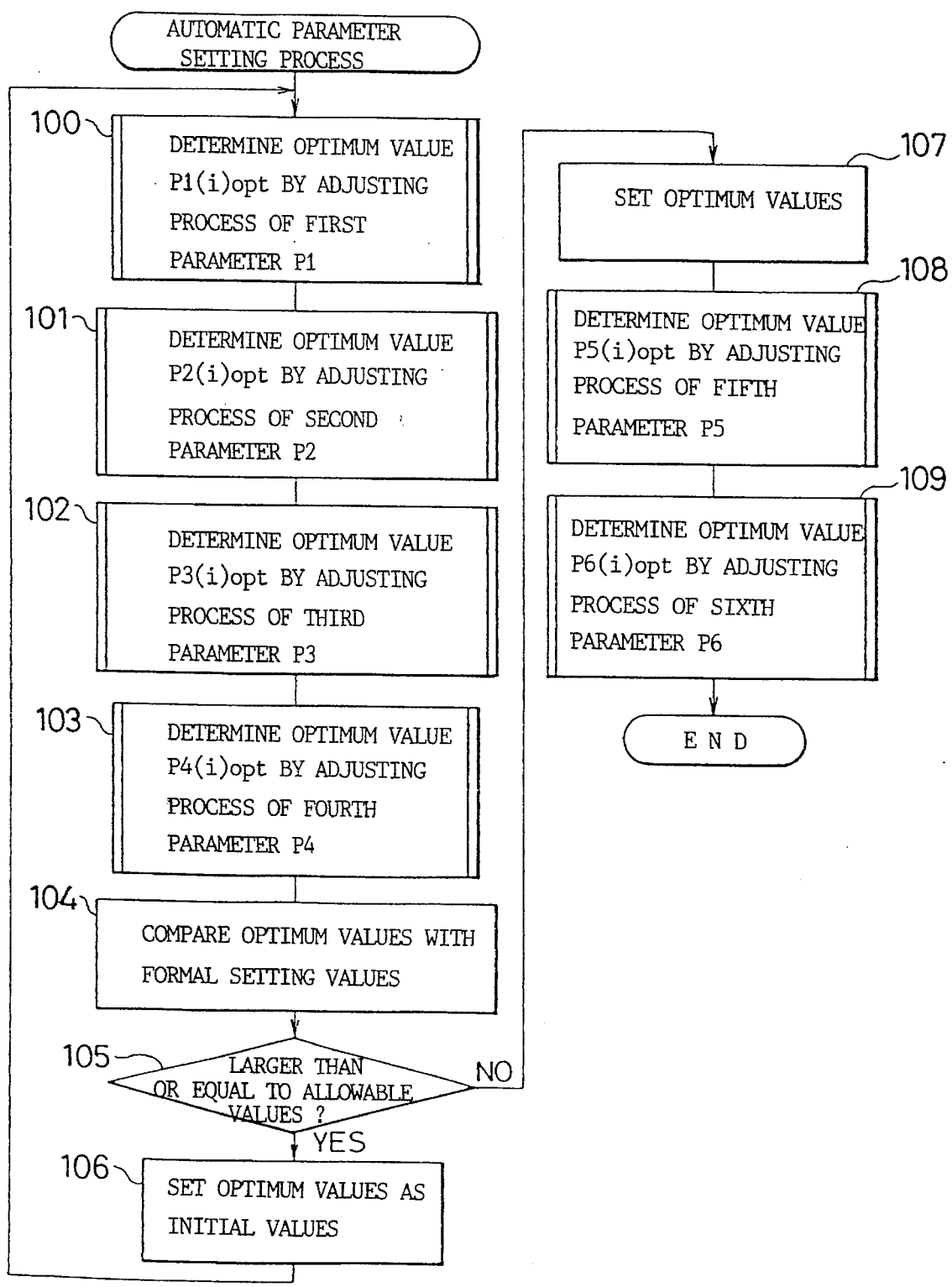
FIG. 2 is a flowchart of an automatic parameter setting process executed by an image central processing unit of FIG. 1.
Figure 3:
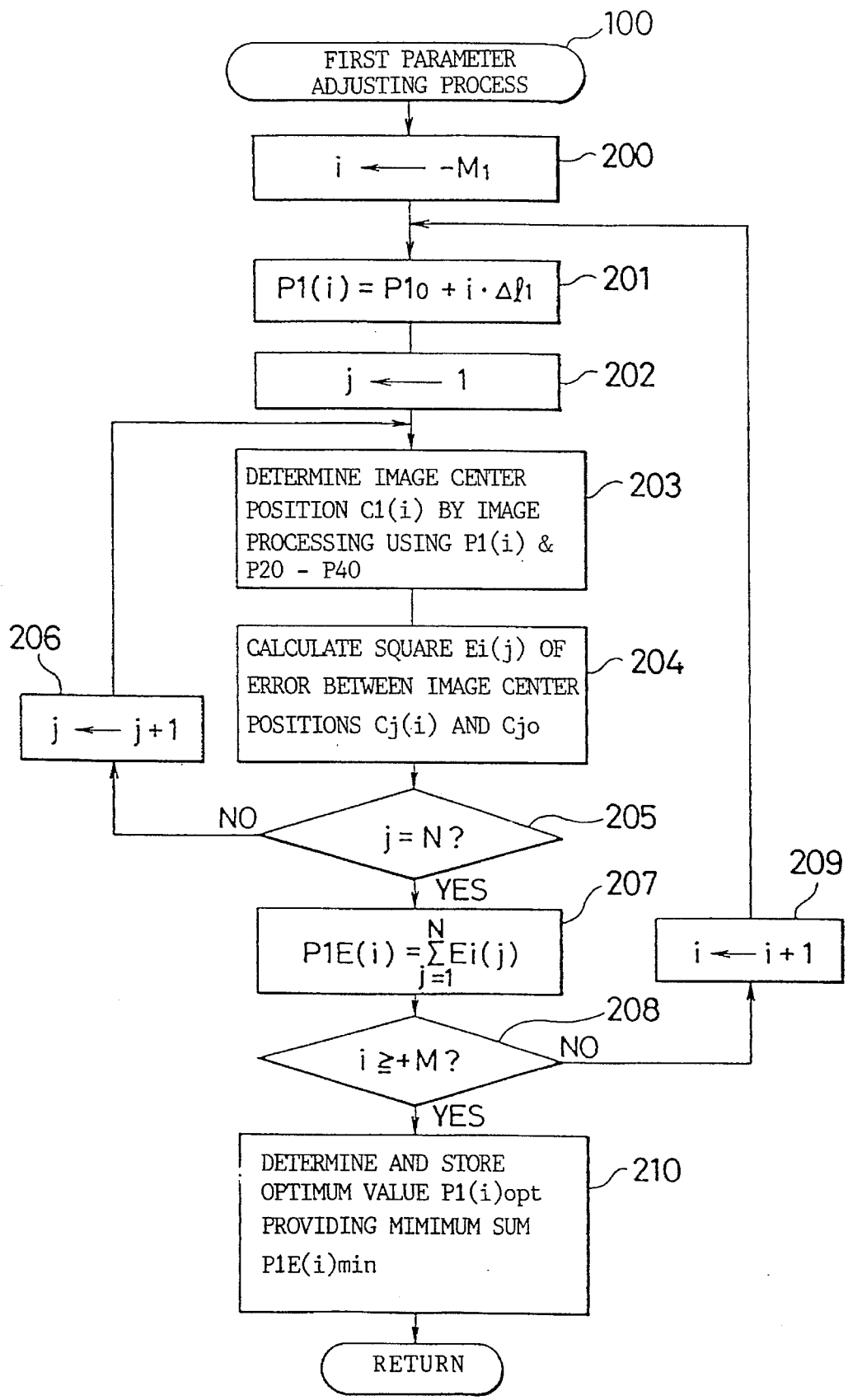
FIG. 3 is a flowchart of a first parameter adjusting process.

When an automatic parameter setting command is input through the console 24, the main CPU 11 executes a first parameter adjusting process of FIG. 3, which corresponds to the step 100 of a main routine shown in FIG. 2.

At first, the CPU 11 sets a first index i to the minimum value of $-M1$ (step 200 of FIG. 3), and renews the initial value (formal setting value) P10 of the first parameter to a value of $P1(-M1)$, generally, $P1(i)$, which value is obtained by adding the product of the index i $(=-M1)$ and an interval $\Delta l1$ of change to the value P10 (step 201). Then, the CPU sets a second index j to a value of "1" (step 202), and causes the first sample image, corresponding to the index j $(=1)$, to be transferred from the hard disk to the frame memory 17. Further, the CPU performs image processing of the first image by the use of the first parameter value $P(-M1)$ and the formal setting values P20 to P40 of the second to fourth parameters, to thereby detect the image center position $C1(-M1)$. Generally, by using the value $P1(i)$, the center position $Cj(i)$ of the j-th image is detected (step 203). Then, the CPU calculates the square $E1(1)$, generally, $Ei(j)$, of the error between the image center position $C1(-M1)$ and a corresponding image center position Cj0 set in the data memory 20 (step 204).

Meanwhile, the value $Ei(j)$ is calculated by deriving the sum of the square of the error between X-axis positions of the image centers $Cj(i)$ and Cjo in the sensor coordinate system and the square of the error between Y-axis positions of these centers.

Further, at step 205 which follows step 204, the CPU determines whether the index j is equal to the total number N of the sample images. Here, the determination result is negative. Hence, at step 206, the CPU renews the index J $(=1)$ to a value of $j+1(=2)$, and then executes the aforementioned steps 203 to 205 again, to thereby calculate a value of $Ei(2)$.

Subsequently, when it is determined at step 205 that the index j equals the total image number N, and hence the squares of the respective errors between the detected image center positions $C1(i), C2(i), ---, CN(i)$ and the corresponding image center positions C10 to CN0 set in the data memory 20 have been calculated for all of the sample images 1 to N with respect to the index i $(=-M1)$, the CPU 11 determines the total sum $P1E(-M1)$ of these calculated values, generally, $P1E(i)$, and causes the program memory 19 to store the total sum (step 207). Further, at step 208 following step 207, the CPU determines whether the index i is equal to or larger than its maximum value of $+M1$. Here, since the determination result is negative, the CPU renews the index $i(=-M1)$ to a value of $i+1(=-M1+1)$ at step 209, and then executes the steps 201 to 208 again, thereby calculating a value of $P1E(-M1+1)$.

Subsequently, when it is determined at step 208 that the index i is equal to or larger than the maximum value $+M1$, i.e., when it is determined that values of $P1E(-M1)$, $P1E(-M1+1), ---, P1E(+M1)$, each representing a corresponding one of the total sums of the squares of the errors between the detected image center positions of the sample images 1 to N and the set image center positions thereof, have been calculated with regard to respective values of the first parameter P1, which changes at intervals of $\Delta l1$ within a region (FIG. 5) from $P10-M1\cdot\Delta l1$ to $P10+M1\cdot\Delta l1$ while the index i is changed from $-M1$ to $+M1$, the CPU 11 determines the minimum value $P1E(i)min$ of these calculated values. Then, the CPU finds that value of the first parameter P1 which provides the aforesaid minimum value, and causes the same to be stored in the program memory 19, as the optimum value $P1(i)opt$ of the first parameter (step 210), whereby the sub-routine process of FIG. 3 is finished. Then, step 101 of the main-routine of FIG. 2 is entered.

Processing procedures in step 101 for determining an optimum value of the second parameter is substantially the same as those in FIG. 3. Namely, the first parameter is fixed to the optimum value of $P1(i)opt$, while the third and fourth parameters are fixed to the formal setting values P30 and P40, respectively. Then, values of $P2E(-M2), P2E(-M2+1), ---, P2E(+M2)$ are determined, each indicating the total sum of the squares of the errors between detected center positions and the set center positions C10 to CN0 of the respective sample images, while changing a value of the second parameter P2 at interval $\Delta l2$, which is the same as or different from the aforesaid interval $\Delta l1$, within a region $P20-M2\Delta l2-P20+M2\Delta l2$ (not shown), which is the same as or different from the the aforesaid region $P10-M1-\Delta l1-P10+M1\Delta l1$. Further, the optimum value $P2(i)opt$ of the second parameter which provides the minimum value $P2E(i)min$ of these calculated values is determined and stored.

At step 102 following step 101, the third parameter is changed, while the first, second and fourth parameters are fixed to the optimum values $P1(i)opt, P2(i)opt$ and the formal setting value P40, respectively. Then, the CPU determines an optimum value $P3(i)opt$ of the third parameter which provides the minimum value of the total sums of the squares of the errors between image center positions which are respectively determined under the above-mentioned conditions. At step 103, an optimum value P4 of the fourth parameter is determined, with the first to third parameters respectively fixed to the optimum values P1(i)opt to P3(i)opt.

Then, the CPU 11 compares each of the optimum values P1(i)opt to P4(i)opt of the first to fourth parameters with a corresponding one of the formal setting values P10 to P40 (step 104), and determines whether the error between each of the optimum values and an associated one of the formal setting values is equal to or larger than an allowable value (step 105). If any one of the errors is equal to or larger than the allowable value, the optimum values are respectively set as the initial values (step 106), and executes steps 100 to 106 again. On the other hand, if each error is less than the allowable value, the optimum values are substituted for the formal setting values in the data memory 20, respectively (step 107).

Figure 4:
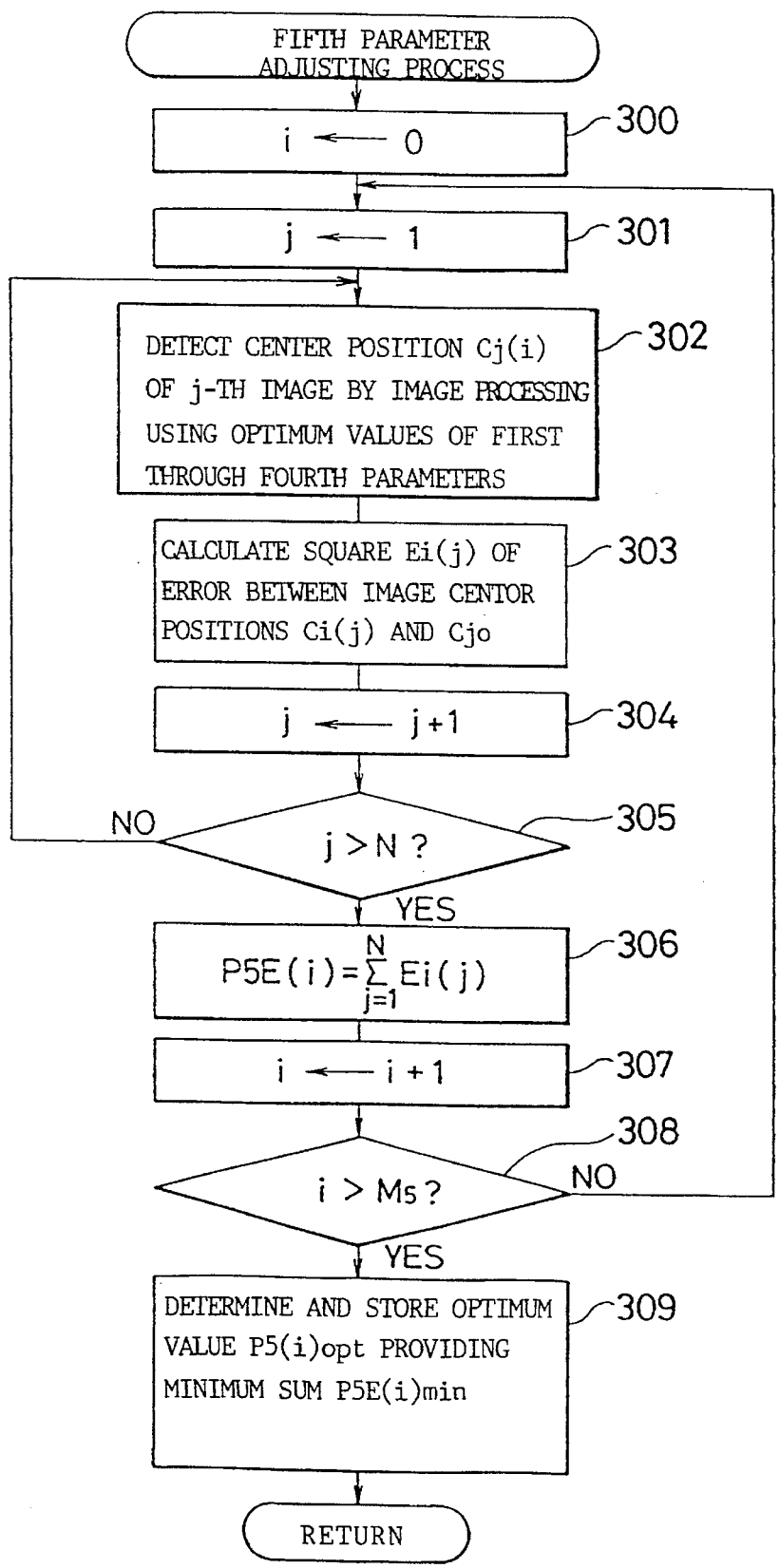
FIG. 4 is a flowchart of a fifth parameter adjusting process.

Next, adjustment processing for the fifth parameter shown in FIG. 4 and corresponding to step 108 is executed. At first, the CPU 11 sets the first and second indexes i, j to values of "0" and "1", respectively (steps 300, 301), and causes the first sample image 1, corresponding to the index j(=1), to be transferred from the hard disk to the frame memory 17. Further, the CPU generally performs pre-processing for the j-th image stored in the frame memory 17, by using the smoother filter of that kind which is represented by a value P5(i) of the fifth parameter corresponding to the index i. Here, since the fifth parameter assumes a value of PS(0) indicating that no smoother filter is required, no pre-processing is performed. The first sample image is then subjected to image processing which utilizes the optimum values of the first to fourth parameters, generally after completion of the pre-processing by the smoother filter, so as to detect the center position Ci(0) of the first sample image, generally, the center position Cj(i) of the j-th image (step 302).

At the subsequent step 303 corresponding to step 204 of FIG. 3, the CPU derives the square E0(1) of the error between a detected center position Ci(0) and the set center position C10, generally, Ei(j), and renews a value of the index j by adding "1" thereto (step 304), and further determines whether the index j is larger than the total number N of the sample images (step 305). Here, since j=2 or the determination result at step 305 is negative, the CPU executes steps 302 to 305 again, to derive a value of E0(2).

Subsequently, when it is determined at step 305 that the index J is larger than the total image number N, or determined that calculation of values E0(1), E0(2), - - - , E0(N) for all of the sample images 1 to N is completed, the CPU 11 calculates the sum PSE(0) of these calculated values, generally, the sum PSE(i), and causes the program 19 to store the calculated sum (step 306). Then, the CPU renews a value of the index i by adding "1" thereto (step 307), and determines whether the index value is larger than the total number M5 of types of the smoother filter (step 308). Here, since the value of the index i is equal to "1" and hence the determination result at step 308 is negative, the CPU executes steps 301 to 308 again, to calculate and store the sum P5E(1) for a case where a first smoother filter is employed.

Thereafter, when it is determined at step 308 that the value of the index i is larger than the total smoother filter number M5, and hence the calculation of the sums P5E(0), P5E(1), - - - , P5E(M5) for a case where all the smoother filters are employed is completed, the CPU 11 determines the minimum value P5E(i)min of these calculated values, and causes the data memory 20 to store an optimum value P5(i)opt of the fifth parameter, which value corresponds to that index value providing the aforementioned minimum value and which indicates the kind of an optimum smoother filter (step 309), whereby the processing of FIG. 4 is completed and step 109 of the main routine is entered.

Processing procedures in step 109 for adjustment processing of the sixth parameter are substantially the same as those in FIG. 2, except in that a total number M6 (not shown) of kinds of the emphasize filter, which is the same as or different from the total number M5 of the smoother filter types, is utilized in place of the value M5.

As explained above, although the operator's operation is partially intervened in a series of steps of storing many sample images, determining the formal setting values P10 to P60 of the taught data on the basis of one of the sample images, and setting the center positions of the sample images, the later processing is automatically carried out. As a result, optimum taught data can be rapidly determined, without the need of the intervention of a skilled operator. Moreover, since the optimum taught data is determined on the basis of many sample images having variations in their shape, size, etc., it is possible to suppress occurrences of erroneous detection and failure of detection when a machine to which the method of the present invention is applied is actually operated in accordance with the taught data.

The present invention is not limited to the foregoing embodiment, and may be modified in various ways.

For example, the embodiment includes steps 104 to 106 to restart the parameter adjustment process using the optimum values of the first to fourth parameters as the initial values thereof when any one of the errors between the optimum values and the formal setting values of the first to fourth parameters is equal to or 5 larger than the allowable value. However, these steps may be omitted if the stability in detecting the object is attained by performing the parameter adjustment once.

In the embodiment, an external memory for sample image storage is comprised of the hard disk. Alternatively, other kinds of memories such as a floppy disk may be employed.

We claim:

1. A taught data setting method in a visual sensor system having a frame memory, comprising the steps of:

(a) capturing a plurality of sample images of an object using the visual sensor system, and storing the plurality of sample images in the frame memory;

(b) determining by a computer of formal setting values of taught data comprising taught data parameters as a model for image processing of said plurality of sample images based on one of the plurality of sample images stored in the frame memory;

(c) detecting and setting by the computer of feature data specifying an object position in each of said plurality of sample images, from each sample image by using the formal setting values;

(d) detecting again by the computer of the respective feature data of the plurality of sample images while varying at least one of the taught data parameters;

(e) automatically determining by the computer of final values of the taught data parameters minimizing an error between each of the respective feature data detected in step (d) and corresponding feature data set in step (c), and automatically setting the final values determined as optimum values of the taught data parameters;

(f) capturing a work object image including a work object using the visual sensor system and storing the work object image in the frame memory; and (g) comparing by the computer of the optimum values of the taught data parameters to the work object in the work object image captured by the visual sensor system and stored in the frame memory and indicating, by the computer, recognition of the work object responsive to the comparison.

2. A taught data setting method in a visual sensor system according to claim 1, wherein step (e) includes the sub-step of setting optimum values of the taught data parameters to minimize a sum of errors between the respective and corresponding feature data.

3. A taught data setting method in a visual sensor system according to claim 1, wherein step (d) includes the sub-step of varying at least one of the taught data parameters by predetermined increments within a predetermined range including the at least one of the taught data parameters.

4. A taught data setting method in a visual sensor system according to claim 1, wherein step (b) includes the sub-step of determining respective formal setting values of the plurality of image setting parameters;

wherein step (d) includes the sub-step of detecting the feature data of the plurality of sample images while each of the plurality of taught data parameters is varied and the other taught data parameters are kept fixed at corresponding formal setting or optimum values; and wherein step (e) includes the sub-step of setting automatically an optimum value of each of the taught data parameters sufficient to minimize the error.

5. A taught data setting method in a visual sensor system according to claim 4, wherein step (e) further includes the sub-step of setting an optimum value of each of the taught data parameters so as to minimize a sum of errors between the respective and corresponding feature data.

6. A taught data setting method in a visual sensor system according to claim 3, wherein step (d) further includes the sub-step of varying each of the formal setting values by a predetermined increment within a predetermined range including the formal setting value of each taught data parameter.

7. A method, comprising the steps of:

a) capturing first and second images of a prototype object using an object image capture device and storing the images as first and second image data in a memory;

b) determining by a computer of first and second object features from the first image data as initial first and second object feature data;

c) determining by the computer of the first and second object features from the second image data;

d) varying by the computer of the first feature data to minimize a first difference between the first object feature of the first image and the first object feature of the second image to obtain optimum first feature data;

e) varying by the computer of the second feature data to minimize a second difference between the second object feature of the first image and the second object feature of the second image to obtain optimum second feature data;

f) capturing a work object image including a work object using the object image capture device and storing the work object image as work object data in the memory; and g) comparing by the computer of the optimum first and second feature data to the work object data of the work object image captured by the object image capture device and indicating by the computer recognition of the work object responsive to the comparison.

8. A method as recited in claim 7, further comprising the step of minimizing a sum of the first and second differences.

9. A method as recited in claim 7, further comprising the step of incrementing the first feature data between the first object feature of the first image and the first object feature of the second image to find a minimum of the first difference.

10. A method as recited in claim 7, further comprising (h) performing an operation with respect to the work object responsive to the recognition indication.

11. A taught data setting method in a visual sensor system which automatically sets image adjusting parameters as teaching datum, comprising:

(a) capturing a plurality of sample images from a plurality of objects of a same kind, and storing the plurality of sample images in a memory;

(b) reading out of the memory by a computer of one of the sample images stored in the memory and image processing the read out image to detect values of image adjusting parameters as teaching datum and setting and storing the image adjusting parameter values as temporarily set parameter values;

(c) reading out of the memory by the computer of the plurality of sample images and applying to each of the sample images the temporarily set parameter values stored to detect a specified object position in the image, displaying the sample images on a display screen, correcting the detected position manually on the display screen, and setting and storing a corrected position specifying data for each of the sample images;

(d) selecting a first parameter from among the image adjusting parameters, varying a value of the selected first parameter iteratively by a predetermined amount around the temporarily set parameter value within a predetermined range while maintaining other image adjusting parameters at the respective temporarily set parameter values, and reading out of the memory by the computer one after another of the plurality of sample images performing image processing on the sample images and obtaining first position specifying data for each image;

(e) comparing by the computer of the position specifying data for each image obtained in step (d) with the corresponding corrected position specifying data for each image set in step (c), setting and storing the image adjusting parameter value selected in step (d) which has produced position specifying data nearest to the corrected position specifying data for every image, as an optimum value of the image adjusting parameter;

(f) selecting a second parameter from among the image adjusting parameters, varying the value of the selected second parameter iteratively by a predetermined amount around the temporarily set parameter value within a predetermined range while maintaining other image adjusting parameters at the respective temporarily set parameters or the optimum value as set in step (e), and reading out of the memory by the computer one after another of the plurality of sample images stored in performing image processing on the sample images and obtaining second position specifying data for each image; and (g) comparing by the computer of the second position specifying data for each image obtained in step (f) with the corresponding corrected position specifying data for each image set in step (c), setting and storing the image adjusting parameter selected in step (f) which has produced position specifying data nearest to the corrected position specifying data for every image, as an optimum value of the image adjusting parameter, and replacing, the temporarily set parameter with the optimum value, respectively.

* * * * *